United States Patent Office 3,365,369
Patented Jan. 23, 1968

3,365,369
LIQUID MODERATED NUCLEAR REACTOR CORE
Frank Geoffrey Greenhalgh and Norman Bradley, Culcheth, England, assignors to United Kingdom Atomic Energy Authority, London, England
Filed May 20, 1966, Ser. No. 551,788
Claims priority, application Great Britain, June 9, 1965, 24,460/65
2 Claims. (Cl. 176—44)

ABSTRACT OF THE DISCLOSURE

A nuclear reactor core having liquid moderator containing vessels with corrugated adjoining walls. Fuel element channels are arranged on two square lattices, the lattices being displaced by half pitch so that fuel element channels on each side of the corrugated walls lie within the corrugations.

---

This invention relates to nuclear reactor cores of the kind which include a calandria vessel or vessels for containing liquid moderator.

By calandria vessel is meant a vessel having tubes (hereinafter termed calandria tubes) extending between two end faces and arranged on a lattice pitch, the tubes defining voids in the moderator through which fuel-containing and coolant-conducting tubes can pass. An example of such a calandria vessel is described in Nuclear Engineering of February 1964, the vessel being used in the core of a heavy water moderated and boiling light water cooled nuclear reactor being constructed at Winfrith Heath, Dorset.

For the efficient operation of large power producing nuclear reactor cores having a large number (for example, more than 120) of fuel containing tubes, it is desirable to be able selectively to vary the power distribution throughout the core and one manner of effecting this condition is to divide the core into sections and to vary the levels of the liquid moderator in the sections. Division may be achieved by providing inner walls in the calandria vessel. Alternatively, division may be achieved by providing a plurality of calandria vessels in grouped arrangement, adjacent walls of the vessels forming section defining inner walls of the core. However, varying the depth of the moderator introduces hydraulic head which the inner walls must be strong enough to support and to increase the wall thickness in order to obtain the required degree of strength is uneconomic because of the introduction of additional neutron absorbing material into the core.

According to the invention, a nuclear reactor core comprises at least one calandria vessel for containing liquid moderator, the core being divided into sections for containing moderator at different levels by at least one inner wall which is adapted to support hydraulic head by corrugations.

Because of the additional strength imparted by corrugations to a wall, the thickness and volume of the material used in a corrugated inner wall of the core is less than that required for a flat wall of equivalent strength.

Preferably, the calandria tubes are arranged on a generally square lattice pitch and a corrugated inner wall of the core is arranged to lie generally in a plane parallel with calandria tubes on one set of parallel co-ordinates of the lattice to divide the calandria tubes into first and second groups, and the complementary co-ordinates of the first group are displaced from the complementary co-ordinates of the second group by a fraction of the pitch so that calandria tubes of each group are partially enclosed within recesses defined by corrugations. Displacement of the calandria tubes on each side of the inner wall by a fraction of the pitch avoids the need greatly to vary the interval between the co-ordinates on each side of and parallel with the inner wall in order to accommodate the corrugations.

However, although with a heavy water moderated reactor having boiling light water coolant in pressure tubes the fast flux distribution across the core is generally uniform, a flux depression is caused by an inner wall. This depression can be off set by increasing slightly the lattice pitch of fuel which is separated by the inner wall thereby increasing moderation.

A construction of nuclear reactor core embodying the invention will now be described, by way of example, with reference to the accompanying drawings wherein.

Figure 1:
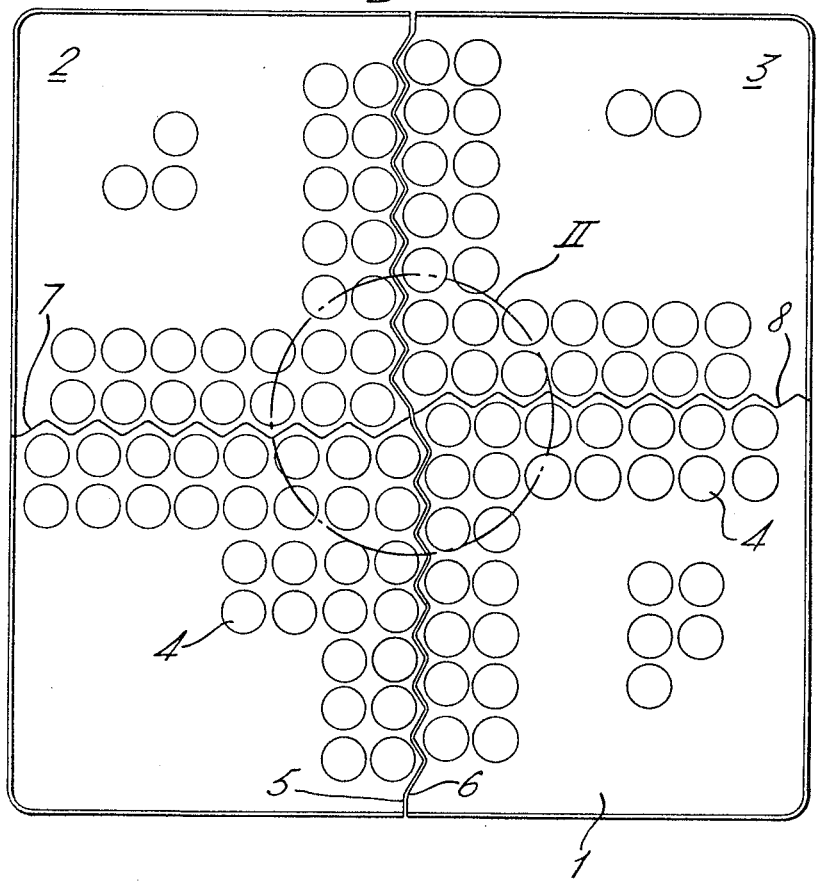
FIGURE 1 is a diagrammatic plan view of the interior of a calandria vessel.

In FIGURE 1 there is shown a nuclear reactor core 1 comprising two calandria vessels 2, 3 for containing liquid moderator such as heavy water and having two hundred and twenty four vertical calandria tubes 4 arranged on a generally square lattice pitch. The core is divided into sections for containing moderator at different levels by inner walls 5, 6, 7 and 8 which are adapted to support hydraulic head by vertical corrugations. The inner walls 7, 8 of the core are formed by inner walls of the vessels which divide the vessels into core section defining compartments. The inner walls 5, 6 of the core is formed by adjacent corrugated walls of the vessels. The inner walls of the core being corrugated are of thinner material than would otherwise be required for flat walls to support hydraulic head so that the penalty of increased neutron absorption and reduced moderation is small. The outer walls of the core are of thicker material (as shown by double lines in FIGURE 1) but could be thin and braced by ribs or corrugated to give additional strength to support hydraulic head.

Figure 2:
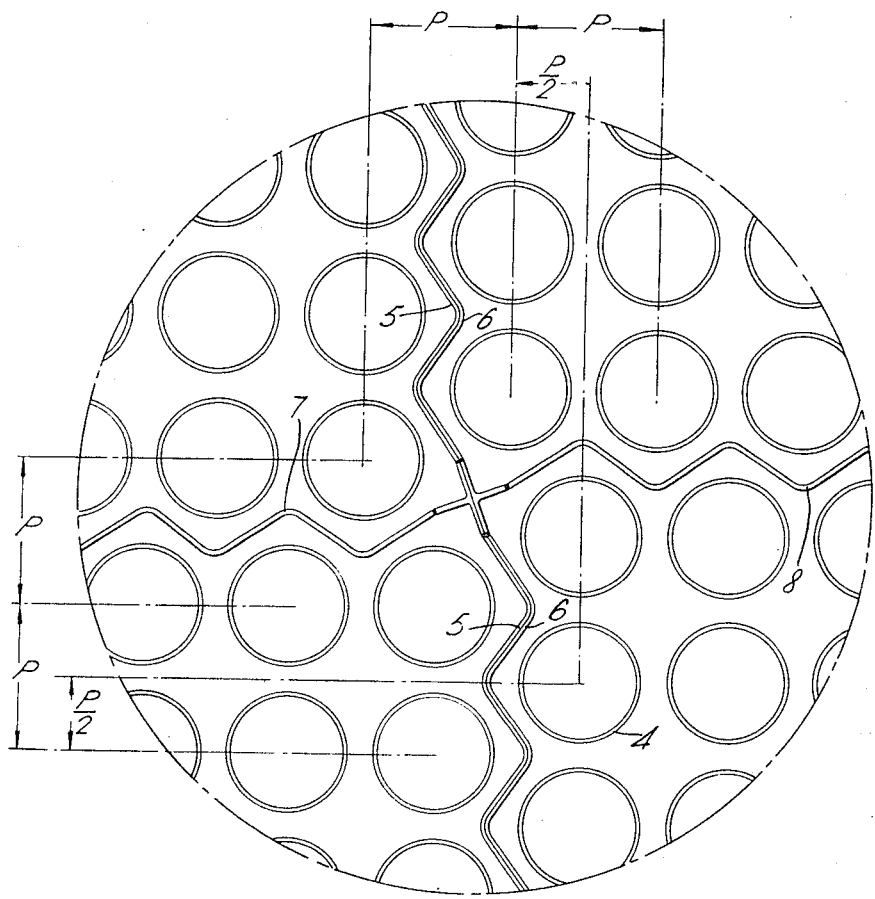
FIGURE 2 is an enlarged view of the region of FIGURE 1 bounded by the circle in broken line and designated II.

As shown in FIGURE 2, the inner walls 7, 8 are arranged to lie between adjacent rows of calandria tubes, that is, generally in a plane parallel with calandria tubes on one set of parallel co-ordinates of the lattice thereby to divide the calandria tubes into two groups. The complementary co-ordinates of one group are displaced from the complementary co-ordinates of the other group by one half of the pitch so that calandria tubes of each group are partially enclosed within recesses defined by the corrugations. The calandria tubes are arranged in a similar manner about the inner walls 5, 6 so that a generally uniform lattice pitch can be achieved. Although not evident from the drawings, because of the inclusion of the neutron absorbing material of the wall and the displacement of moderator, the pitch of the calendria tubes across the inner walls of the core is increased slightly but the displacement of the opposed co-ordinates enables the optimum pitch to be obtained.

The calandria vessel is fabricated from a material having a low neutron absorption cross section in order to reduce the flux depression caused by introduction of inner walls to the core. Suitable materials are aluminium alloy having approximately 2.5% magnesium and designated N4 and magnesium alloy having 0.55% to 0.85% manganese and known as MN70.

We claim:
1. A nuclear reactor core having at least one vessel containing liquid moderator, means defining a plurality of fuel element channels extending into said moderator, wall means dividing said core into at least two compartments and dividing said channels into at least first and second groups of channels, said groups of channels being arranged on square lattices of equal pitch, said lattice of said first group being displaced from said lattice of said second group in the direction parallel with said wall means by a fraction of the pitch, said wall means being corrugated and disposed with said corrugations partly encompassing fuel element channels.

2. A nuclear reactor core according to claim 1, having a plurality of vessels for containing liquid moderator and wherein said corrugated wall means dividing said core into a plurality of compartments is formed jointly by adjacent walls of adjacent vessels.

References Cited

UNITED STATES PATENTS

| | | | |
|---|---|---|---|
| 2,598,160 | 5/1952 | Gruenais | 220—1 |
| 2,747,959 | 5/1956 | Ingelson | 220—22 X |
| 2,816,068 | 12/1957 | Ruano | 176—63 X |
| 3,099,616 | 7/1963 | Bauer et al. | 176—42 X |
| 3,108,937 | 10/1963 | Kumpf et al. | 176—64 X |
| 3,175,958 | 3/1965 | Bourgade | 176—87 |

FOREIGN PATENTS 908,534   10/1962   Great Britain.

REUBEN EPSTEIN, *Primary Examiner.*